United States Patent [19]
Sanderson

[11] 3,776,652
[45] Dec. 4, 1973

[54] SHEET METAL JOINT
[76] Inventor: Edward Sanderson, 159 Algonquin, Park Forest, Ill. 60466
[22] Filed: Nov. 17, 1972
[21] Appl. No.: 307,412

[52] U.S. Cl. ............... 403/282, 29/509, 403/393
[51] Int. Cl. .............................................. F16b 5/07
[58] Field of Search .......................... 287/189.36 D; 29/509, 521; 113/116 H, 116 Y; 138/74

[56] References Cited
UNITED STATES PATENTS

| | | |
|---|---|---|
| 3,082,850 | 3/1963 | Weening .................... 287/189.36 D |
| 2,586,479 | 2/1952 | Pettorossi ................. 287/189.36 D |
| 2,321,755 | 6/1943 | Kost .......................... 287/189.36 D |
| 3,470,596 | 10/1969 | Belada ................................. 29/509 |
| 3,599,318 | 8/1971 | Behlen ...................... 287/189.36 D |

FOREIGN PATENTS OR APPLICATIONS
1,452,820  3/1969  Germany .............................. 29/509

Primary Examiner—Dave W. Arola
Assistant Examiner—Conrad L. Berman
Attorney—Robert L. Zieg

[57] ABSTRACT

A coatable or paintable joint formed between the end of a coil of sheet metal and the beginning of a coil of sheet metal comprising a hole pierced through the pieces of sheet metal to form tabs which are turned upon themselves to secure the sheet metal portions together and including a circular ridge formed on opposite sides of said sheet metal surrounding said pierced hole, each of said ridges being offset from the general plane of sheet metal pieces to protect the coating or painting rollers from damage when the joint passes over same.

3 Claims, 8 Drawing Figures

PATENTED DEC 4 1973 3,776,652

SHEET METAL JOINT

SUMMARY OF THE INVENTION

In certain sheet metal coating or painting operations in which an entire coil of sheet metal is to be coated or painted, it is common practice that when the end of the coil is approaching the coating or painting rollers, the beginning of the next coil is joined to the end of the first coil so that the new coil may be started through the coating operation. Prior to the present invention, a sheet metal joint is formed between the ends of the coils such that, if the joint were to travel through the rubber coating rollers, damage to the rollers would result due to the sharp edges formed in the joint. Therefore, it is common practice to move the coating rolls away from the sheet metal until the joint has passed through the coating station. This results in substantial waste of material which is not coated or painted and is done for the purpose of preventing damage to the coating rollers.

The present invention provides a sheet metal joint which is coatable or paintable and which will not damage the rubber coating or painting rollers. This unique joint of the present invention comprises a hole pierced through the end of one coil of the sheet metal and the beginning of the next coil of sheet metal forming tabs which are bent approximately 180° or more to secure the sheet metal portions together and, at the same time, forming on either side of the sheet metal assembly, ridges which are higher or are offset from the general plane of the sheet metal assembly such that when the rubber rollers contact the circular ridges surrounding the pierced holes, the rubber is stretched so that it cannot enter the pierced hole and cannot contact any of the sharp edges formed in the sheet metal.

Figure 5:
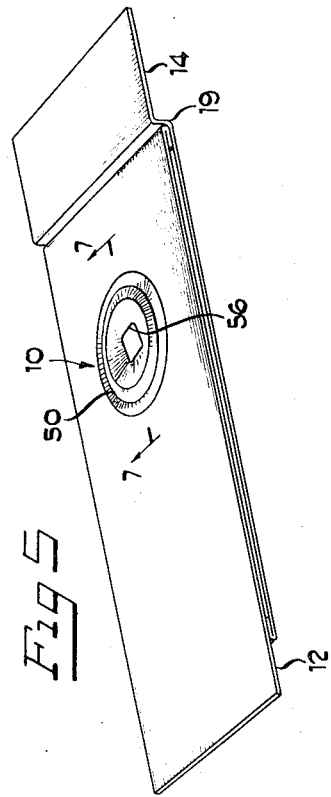
FIG. 5 is a perspective view of the finished joint made in accordance with the principles of the present invention.
Figure 6:
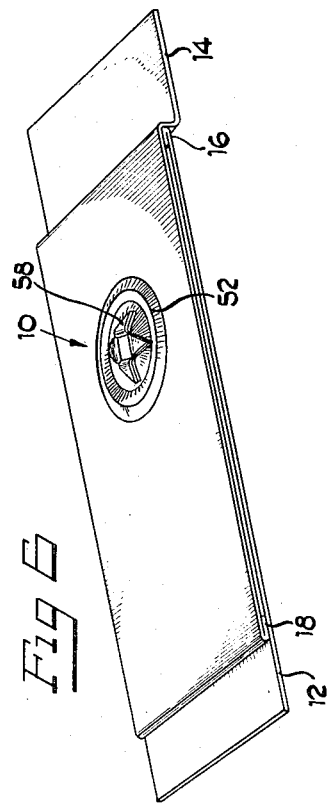
FIG. 6 is a perspective view showing the opposite side of the joint illustrated in FIG. 5.
Figure 7:
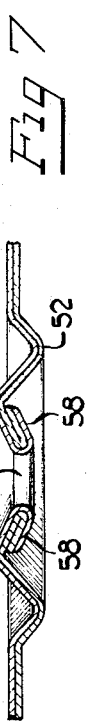
FIG. 7 is a sectional view taken along the lines 7—7 of FIG. 5.

Referring to the drawings and FIGS. 5, 6 and 7 in particular, the unique sheet metal joint of the present invention is illustrated. A joint 10 is shown formed between an end portion 14 of a coil of sheet metal and a beginning portion 12 of another coil of sheet metal.

The end of portion 12 is folded under at 16 and the end of portion 14 is folded under at 18. These folds may be made in any known manner and could be formed, for example, as a part of coiling of the sheet metal in the manufacture thereof. An offset 19 is also formed by a die at the time of the forming of the joint. The folds 16 and 18 are formed to prevent any sharp edges being presented to the painting rollers, as will later be described.

Figure 8:
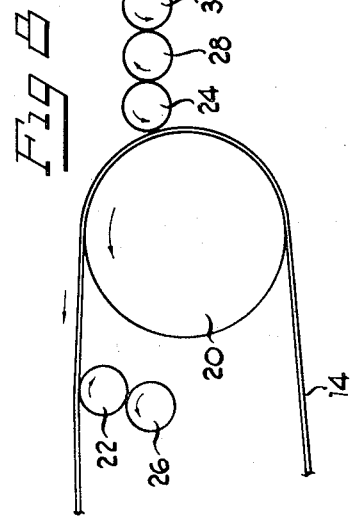
FIG. 8 is a schematic view showing the driving and coating rollers through which the joint of the present invention is designed to pass.

The painting or coating operation of the sheet metal is shown in FIG. 8. A driving roller or drum 20 has the sheet metal moving around same as the coating is done. There is also provided rubber painting or coating rollers 22 and 24. In contact with the rubber rollers 22 and 24 which actually coat the sheet metal passing by, are coating material supply rollers 26 and 28 respectively. A driving roller 30 is also shown in contact with and driving roller 28.

As will be later apparent, the purpose of this invention is to form a sheet metal joint which can pass between rollers 20 and 24 and over rollers 22 without damaging the surface of the rubber rollers. The folds 16 and 18, offset 19, and the shape and form of the joint 10 are all designed to prevent damage to the coating rollers.

End portion 14 is, for example, the end part of a coil of sheet metal passing through the coating operation. When the end of the coil approaches the coating station it is normally required to move the coating rolls away from the sheet metal to prevent damage thereto by the sheet metal joint securing the coil ends together passing through and thereby creating a length of uncoated or scrap material.

In the case of the unique sheet metal joint of the present invention, the following steps are performed making it possible for the next sheet to be pulled through by the sheet metal having end portion 14 without changing the position of the rollers and thereby eliminating the large amount of scrap uncoated material.

The folds 16 and 18 are formed, and then offset 19 and sheet metal joint 10 are formed. The sheet metal can then be driven through the coating rollers and the coating of the new sheet 12 performed on a continuous manner. The forming of folds 16 and 18 is not illustrated but can be carried out by known methods of metal bending or forming.

Figure 1:
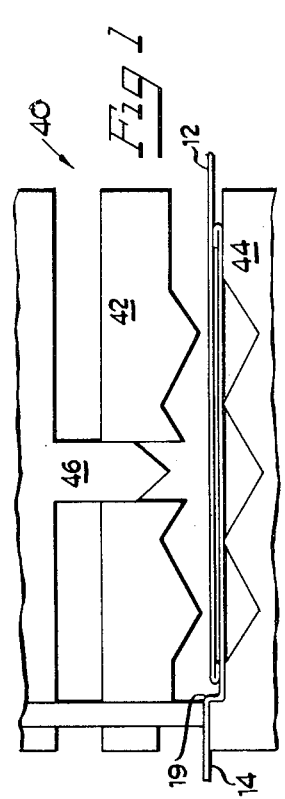
FIG. 1 is a sectional view through a die set used to form the joint of the present invention.
Figure 2:
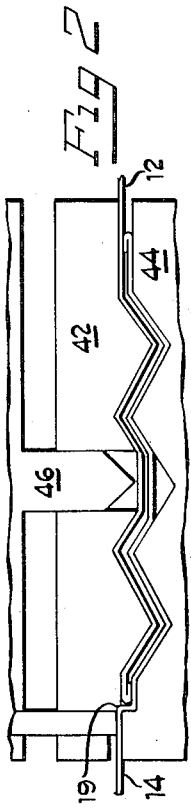
FIG. 2 is a view similar to FIG. 1 showing the forming operation.
Figure 3:
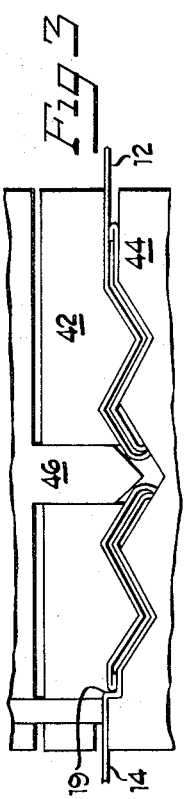
FIG. 3 is a view similar to FIG. 2 showing the punching and curling operation.
Figure 4:
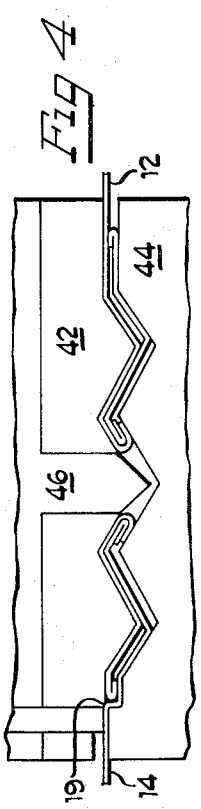
FIG. 4 is a view similar to FIG. 3 showing the final curling of the tabs.

Referring to FIGS. 1 through 4, the forming of the sheet metal joint 10 is illustrated. A die 40 is illustrated which comprises an upper die 42, a lower die 44, and a punch 46. FIG. 1 shows the coil portions 12 and 14 to be joined laying in the die 40. In FIG. 2 the forming operation is performed, the upper and lower dies coming together and forming the general shape of the joint shown in FIG. 7. In FIG. 3 punch 46 has pierced the sheet metal and is curling severed portions thereof underneath. In FIG. 4 the final curling of the tabs occurs securing the sheets together.

The above steps comprise a new method for joining end portions of the sheet metal coils to produce a coatable or paintable joint which can be described by the following steps:

1. Folding under the ends of each coil to be joined,
2. placing the end portions of each coil in a die, one on top of the other,
3. forming concentric circular ridges on either side of the general plane of the sheet metal portions and forming an offset in one end portion of a coil,
4. piercing a hole in the sheet metal assembly forming tabs around the hole periphery,
5. curling said tabs in direction away from said periphery, and
6. final curling or bending of said tabs to a position approximately 180° from the plane of the sheet metal in the immediate area of the pierced hole to secure said assembly together.

The sheet metal joint 10 that results from the above steps has a high circular ridge 50, as shown in FIG. 7, on the top side thereof, and a high circular ridge 52 on the under side thereof. This is to say that the ridges 50 and 52 are outside of the plane of the sheet metal portions in which they are formed. Punch 46 is square shaped and comes to a point with beveled sides forming four flat cutting surfaces and pierces a square hole 56 in the sheets of metal. Since the punch has four flat cutting surfaces, four tabs 58 are formed in the punching operation. It is the tabs 58 that are curled under the sheets in FIG. 3 and which are bent 180° or more, tightly upon the sheet metal material as shown in FIG. 4. It is the tabs 58 which actually secure the sheet metal together, as shown in FIGS. 5 and 6.

In practice, when the joint 10 is moved through the coating roller station no damage will occur to the rubber rollers. When the rubber rollers roll over the joint 10 either the top or bottom thereof, they contact the high circular ridges 50 or 52. These ridges, in effect, stretch the rubber in this area and prevent it from entering the punched hole 56 or coming in contact with the sharp edges of tabs 58.

Thus Applicant has provided a unique sheet metal joint which can be coated or painted without damage to the coating or painting rolls and a unique method for making said joint. Thereby, waste material created by known methods during a change of coils for coating is substantially reduced by the present invention.

Various features of the invention have been particularly shown and described. However, it should be obvious to one skilled in the art that modifications may be made therein without departing from the scope of the invention.

What is claimed is:

1. A coatable sheet metal joint for securing together two pieces of sheet metal and usable to pass through rubber coating rollers of a coating operation including a hole through said sheets, adjacent bent over tabs in each piece at the edge of said hole securing said pieces in abutting relationship, a circular ridge in said sheet metal pieces on each side thereof adjacent to and surrounding said hole, said ridge on each side positioned outside of the plane containing said hole so that when said joint is passed through said rubber coating rollers, said rollers cannot extend into said hole.

2. A coatable sheet metal joint as claimed in claim 1 wherein said hole is square in configuration.

3. A coatable sheet metal joint as claimed in claim 1 wherein said tabs are bent approximately 180° in a direction away from said hole to secure said pieces together.

* * * * *